US012082562B2

(12) United States Patent
Van Der Linde (10) Patent No.: US 12,082,562 B2
(45) Date of Patent: Sep. 10, 2024

(54) FEEDING SYSTEM AND METHOD FOR FEEDING ANIMALS, AND FEED GRABBER

(71) Applicant: LELY PATENT N.V., Maassluis (NL)

(72) Inventor: Jakob Van Der Linde, Maassluis (NL)

(73) Assignee: LELY PATENT N.V., Maassluis (NL)

(*) Notice: Subject to any disclaimer, the term of this patent is extended or adjusted under 35 U.S.C. 154(b) by 135 days.

(21) Appl. No.: 17/601,999

(22) PCT Filed: Apr. 16, 2020

(86) PCT No.: PCT/NL2020/050252
§ 371 (c)(1),
(2) Date: Oct. 7, 2021

(87) PCT Pub. No.: WO2020/218922
PCT Pub. Date: Oct. 29, 2020

(65) Prior Publication Data
US 2022/0211000 A1    Jul. 7, 2022

(30) Foreign Application Priority Data

Apr. 25, 2019    (NL) ........................... 2023006

(51) Int. Cl.
*A01K 5/02*    (2006.01)
(52) U.S. Cl.
CPC ........................ *A01K 5/02* (2013.01)
(58) Field of Classification Search
CPC .... A01K 5/02; B66C 3/02; B66C 3/12; B66C 3/18
See application file for complete search history.

(56) References Cited

U.S. PATENT DOCUMENTS 6,220,641 B1 * 4/2001 Muniak ............... B66C 3/18
294/104
6,331,025 B1 * 12/2001 Douglas ............ B66C 1/442
294/110.1

(Continued)

FOREIGN PATENT DOCUMENTS

CN    105692438 A    6/2016
GB    628045         8/1949
WO    WO 2015/023177 A1    2/2015

OTHER PUBLICATIONS

International Search Report, issued in PCT/NL2020/050252, dated Jul. 22, 2020.

(Continued)

*Primary Examiner* — Monica L Perry
*Assistant Examiner* — Edgar Reyes
(74) *Attorney, Agent, or Firm* — Birch, Stewart, Kolasch & Birch, LLP (57) ABSTRACT

A feeding system for feeding animals, in particular cows, includes a feed storage system for keeping feed for the animals in store, and a feed loading device for loading a batch of feed from the feed storage system into a receptacle of an autonomous feeding device in order to teed the animals. The feed loading device is provided with a feed grabber including two grab buckets which are hingeable between an open position and a closed position. The feed grabber includes an actuation device for actuating the grab buckets from the open position to the closed position. The actuation device includes a rotatably drivable winding-up body which is connected to one of the grab buckets and includes a winding circumference, and an arm which is connected between the winding-up body and the other grab bucket. The arm includes a plurality of mutually, hingeably connected arm sections which are made from stainless steel or a material having substantially the same strength and corrosion-resistant properties as stainless steel. The arm sections, in the open position of the grab buckets, extend substantially in line with one another. The arm sections, from the open position of the grab buckets, when the winding-up body is rotatably driven, are wound about the winding circumference of the winding-up body in order to pull the grab buckets towards the closed position. The arm sections are configured in such a way that the winding circumference of the winding-up body can be covered substantially in its entirety by at most 8 arm sections, preferably at most 6 arm sections, in particular 2 or 3 or 4 or 5 arm sections.

20 Claims, 8 Drawing Sheets

(56) References Cited

U.S. PATENT DOCUMENTS

| | | | |
|---|---|---|---|
| 9,522,811 B2* | 12/2016 | Van Kuilenburg | B66C 13/18 |
| 2008/0251024 A1* | 10/2008 | Bos | A01K 5/02 |
| | | | 901/41 |
| 2010/0031891 A1* | 2/2010 | Sie | A01K 5/0266 |
| | | | 119/53 |
| 2010/0126423 A1* | 5/2010 | Van Den Berg | A01K 5/0266 |
| | | | 119/57.92 |
| 2011/0283571 A1 | 11/2011 | Vuistiner | |
| 2016/0165837 A1 | 6/2016 | Van Der Linde et al. | |

OTHER PUBLICATIONS

Written Opinion of the International Searching Authority, issued in PCT/NL2020/050252, dated Jul. 22, 2020.

* cited by examiner

FEEDING SYSTEM AND METHOD FOR FEEDING ANIMALS, AND FEED GRABBER

The invention relates to a feeding system for feeding animals, in particular cows, such as dairy cows or meat cows.

WO 2015/023177 A1 discloses a feed grabber which may be used with an automatic feeding system for feeding animals. The feed grabber is situated above at least one block of feed. The feed grabber is suspended from a crab so as to be vertically displaceable by means of a hoisting device. The feed grabber comprises two grab buckets which are hingeable between an open position and a closed position. After the feed grabber has been lowered, with the grab buckets in the open position, to a suitable height with respect to the block of feed, the feed grabber is closed for grabbing an amount of feed from the block of feed. In order to close the feed grabber, one end of a closing/auxiliary hoisting belt is wound around a first winding drum which is arranged on the crab. At its other end, the closing/auxiliary hoisting belt is wound onto a second winding drum which is connected to one of the grab buckets. A cable is provided between the second winding drum and the other grab bucket. Upon rotation of the second winding drum, the cable exerts a pulling force, i.e. the grab buckets are pulled to the closed position by the cable.

The cable often comes into contact with the feed for the animals which is formed, for example, by silage or a bale of feed formed by a baling press. Silage and feed from bales are relatively acidic, which leads to a limited service life of the cable, even if the cable is made from a material having favorable properties. Due to the fact that the cable has to be replaced relatively often, the maintenance costs and maintenance activities are not optimal.

It is an object of the invention to provide an improved feeding system comprising a feed grabber, wherein in particular the maintenance costs and/or maintenance activities are reduced.

This object is achieved according to the invention by a feeding system for feeding animals, in particular cows, such as dairy cows or meat cows, comprising:
- a feed storage system for keeping feed for the animals in store, in particular a feed kitchen containing different types of feed, such as blocks of silage cut out of a silage pit and/or pressed bales,
- an autonomous feeding device for feeding the animals feed from the feed storage system, wherein the feeding device is provided with a receptacle for receiving a batch of feed,
- a feed loading device for loading feed from the feed storage system into the receptacle of the autonomous feeding device, wherein the feed loading device is provided with a feed grabber comprising two grab buckets which are hingeable between an open position and a closed position, in particular wherein the grab buckets are mutually connected by an upper hinge, and wherein the feed grabber is provided with an actuation device for actuating the grab buckets from the open position to the closed position, wherein the actuation device is provided with a rotatably drivable winding-up body which is connected to one of the grab buckets and comprises a winding circumference, and an arm which is connected between the winding-up body and the other grab bucket, wherein the arm comprises a plurality of mutually hingeably connected, preferably elongate, arm sections which are made from stainless steel or a material, in particular a plastic, having substantially the same strength and/or corrosion-resistant properties as stainless steel, wherein the arm sections, in the open position of the grab buckets, extend substantially in line with one another, i.e. from the one grab bucket to the other grab bucket, and wherein the arm sections, from the open position of the grab buckets, when the winding-up body is being rotatably driven, are wound about the winding circumference of the winding-up body in order to pull the grab buckets towards the closed position during the rotatable driving of the winding-up body, and wherein the arm sections are configured in such a way that the winding circumference of the winding-up body can be covered substantially in its entirety by at most 8 arm sections, preferably at most 6 arm sections, in particular 2 or 3 or 4 or 5 arm sections.

The cable known from the above-mentioned prior art is replaced according to the invention by a specially designed articulated arm composed of a plurality of mutually hingeably connected arm sections. The arm according to the invention forms a kind of "chain" which is wound around the winding circumference of the winding-up body. With a chain drive, it is important to prevent the polygon effect as much as possible, i.e. the pitch circle is usually as large as possible with respect to the pitch spacing between the chain links. However, the available installation space inside one of the grab buckets is small, as a result of which it is desirable to keep the "pitch circle" of the winding-up body relatively small. However, this would require small "chain links" made of a strong type of steel-stainless steel is not sufficiently strong. This in turn brings with it the problem of insufficient corrosion resistance of such strong types of steel. According to the invention, a solution has been found by making the arm sections ("links") preferably from stainless steel, which is particularly suitable for use with components which come into contact with animal feed. Moreover, in connection with the relatively low strength of stainless steel, unusually long arm sections have been opted for, i.e. arm sections which are so long that the relatively small winding circumference of the winding-up body is already substantially entirely covered by only 2-8 arm sections, in particular 2 or 3 or 4 or 5 arm sections. Such long arm sections can be designed to have sufficient strength, even if these are made of stainless steel. According to the invention, it is also possible to use a different material, such as a plastic, having substantially the same strength and corrosion-resistant properties as stainless steel instead of stainless steel. Although the long arm sections cause a considerable polygon effect, this is acceptable with the feed grabber according to the invention, since the speed of movement is relatively low and the arm does not perform a rotating, but a reciprocating movement. Therefore, the feed grabber comprising the arm according to the invention is particularly strong, durable and reliable, so that the maintenance costs and maintenance activities are reduced.

According to the invention, it is preferable if the grab buckets and/or the winding-up body and/or the arm are/is entirely made of stainless steel or a material having substantially the same strength and/or corrosion-resistant properties as stainless steel. This is particularly suitable for use with components which come into contact with relatively acidic animal feed. As a result thereof, the service life of the feeding system according to the invention is considerably increased.

In a particular embodiment according to the invention, when the grab buckets move from the open position into the closed position, the winding-up body performs more than 1 turn, such as substantially 1.5 turns, wherein, after the winding circumference of the winding-up body has been covered substantially entirely by a number of the arm sections, only one single further arm section extends on top or alongside thereof. If the winding-up body performs more than a complete turn, the arm sections are prevented from ending up on top of each other during winding, which would result in a larger winding circumference ("pitch circle") in the closed position of the grab buckets. This is undesirable because a larger winding circumference results in a reduced pulling force at the same drive torque on the winding-up body.

Preferably, the arm consists of only 2 or 3 or 4 or 5 arm sections. By using relatively long arm sections, a limited number of arm sections is sufficient to perform the movement of the grab buckets from the open position to the closed position. As a result thereof, the arm according to the invention is particularly reliable.

In a preferred embodiment according to the invention, each arm section has a pitch length which is determined by the distance between the two hinge axes of said arm section, wherein the sum of the pitch lengths of the arm section connected to the winding-up body and the adjacent 2 or 3 arm sections is substantially equal to or greater than the winding circumference of the winding-up body in order to cover the winding-up body substantially completely in the closed position. In this case, the winding circumference can be covered substantially in its entirety by at most 3 or 4 arm sections. The winding circumference ("pitch circle") of the winding-up body is relatively small, whereas arm sections having a relatively large pitch length are being used, which are sufficiently strong, even if the arm sections are made of stainless steel.

In this case, the pitch length of the arm section connected to the winding-up body and the pitch length of the adjacent arm sections which together, in the closed position of the grab buckets, substantially completely cover the winding circumference can be substantially equal, with the pitch length of the subsequent arm section being greater than the pitch length of the arm section connected to the winding-up body. In this case, this subsequent arm section is longer, i.e. projects radially from the winding circumference and can, as a result thereof, be connected directly to the other grab bucket, in particular a hook part which is fixedly attached to this other grab bucket. When moving the grab buckets to the closed position, this subsequent arm section is not wound over the arm sections which have already been wound up, but runs to the other grab bucket. As a result thereof, the winding circumference remains minimal, which is advantageous for forces to be transmitted.

In an embodiment according to the invention, the winding-up body comprises a winding core which determines the winding circumference, and a crank arm which is attached to the winding core and which projects radially with respect to the winding core, wherein the arm section connected to the winding-up body is hingeably connected to the crank arm, and wherein the arm sections are wound around the winding core from the open position of the grab buckets when the winding-up body is being rotatably driven. The crank arm determines a first hinge for the arm, i.e. the arm section connected to the winding-up body is connected to the crank arm by means of this first hinge. This embodiment is particularly strong.

In this case, it is possible according to the invention for the winding core to have a substantially cylindrical outer surface which determines a substantially circular winding circumference, and wherein the arm sections which are wound around the winding core from the open position of the grab buckets when the winding-up body is being rotat- ably driven and which come into contact with said outer surface on a longitudinal side thereof, are provided with longitudinal edges on said longitudinal sides, which edges have a shape which at least partly corresponds to said outer surface, i.e. comprise a circular arc shape. As a result thereof, the arm sections come to lie tightly around the winding core during winding, so that the arm can be wound up and unwound in a reliable manner. In addition, in the closed position of the grab buckets, the wound-up arm is compact. This is an advantage because the installation space is limited. In an embodiment according to the invention, the feed grabber is suspended from a crab so as to be vertically displaceable by means of a hoisting device, which comprises a first electrical motor which is fitted to the crab, and wherein the actuation device for actuating the grab buckets from the open position to the closed position is provided with a second electrical drive motor which is fitted to the crab, and a transmission device for transmitting a drive torque from the second electrical motor to the winding-up body which is connected to one of the grab buckets. As a result thereof, the drive motors are situated outside the feed grabber, so that the feed grabber is free from electrical components. The feed grabber only comprises moving parts which are operated mechanically. This is particularly advantageous for reliability.

In an embodiment according to the invention, each grab bucket comprises a grab bucket bottom with a bottom edge, wherein each grab bucket is provided with grab bucket side walls which extend on either side of the grab bucket bottom of said grab bucket, wherein every grab bucket side wall is delimited by a side edge, wherein the bottom edges of the grab bucket bottoms and the side edges of the grab bucket side walls substantially adjoin each other in the closed position of the grab buckets. If the feed grabber has grabbed an amount of feed, the bottom edges and side edges may be a slight distance apart in the closed position and hold the amount of feed between them. Preferably, the bottom edges and/or the side edges are provided with gripping teeth. Such an embodiment of the feed grabber is particularly suitable for gripping animal feed, such as silage or pressed bales.

In an embodiment according to the invention, the feed storage system comprises a plurality of feed storage locations which are situated separated from each other, in particular for receiving in each an amount of feed, for example a cut block of silage or a pressed bale, and wherein the feed grabber is arranged above the feed storage locations so as to be displaceable in a substantially horizontal plane and is substantially vertically displaceable for grabbing in each case an amount of feed from one of the feed storage locations and transferring it to the receptacle of the autonomous feeding device for loading it with a batch of feed for the animals. Such a feed storage system forms, for example, a feed kitchen or intermediate feed store. A farm may store silage in silos and/or may store wrapped bales. The silage can be cut block by block and placed in the feed kitchen. After the wrapping film has been removed and the optional cutting of the bales, these may also be placed in the feed kitchen. Obviously, further types of feed may be included, such as maize, potatoes, etc. A feed kitchen is reliable and accurate, in particular in combination with a feed grabber according to the invention. In an alternative embodiment according to the invention, the feed grabber is integrated with the autonomous feeding device. In this case, the autonomous feeding device can drive into the feed kitchen in order to load feed into the receptacle of the feeding device, and/or the autonomous feeding device drives to the silos containing silage and/or stored bales in order to load feed directly, i.e. without intermediate storage, into the receptacle of the feeding device.

In an embodiment according to the invention, the feeding system comprises at least one feed fence for feeding the animals, wherein the feeding device is configured to autonomously move a batch of feed received in the receptacle from the feed storage system to the feed fence and autonomously dispensing and/or metering said feed along the feed fence. In particular, the feeding system according to the invention is automated or fully automated.

The invention also relates to a feed grabber comprising two grab buckets which are hingeable between an open position and a closed position, wherein the feed grabber is provided with an actuation device for actuating the grab buckets from the open position to the closed position, wherein the actuation device is provided with a rotatably drivable winding-up body which is connected to one of the grab buckets and comprises a winding circumference, and an arm which is connected between the winding-up body and the other grab bucket, wherein the arm comprises a plurality of mutually hingeably connected, preferably elongate, arm sections which are made from stainless steel or a material, in particular plastic, having substantially the same strength and corrosion-resistant properties as stainless steel, wherein the arm sections extend substantially in line with one another in the open position of the grab buckets, i.e. from one grab bucket to the other grab bucket, and wherein the arm sections, from the open position of the grab buckets, when the winding-up body is being rotatably driven, are wound around the winding circumference of the winding-up body in order to pull the grab buckets towards the closed position, and wherein the arm sections are configured such that the winding circumference of the winding-up body can be covered substantially completely by at most 8 arm sections, preferably at most 6 arm sections, in particular 2 or 3 or 4 or 5 arm sections. This feed grabber may be configured as described above in connection with the feeding system according to the invention and has the same technical advantages and effects as described above.

The invention furthermore relates to a method for feeding animals, in particular cows, such as dairy cows or meat cows, by means of a feeding system as described above, wherein the method comprises the following steps:
  a) grabbing an amount of feed from the feed storage system by means of the feed grabber and moving the feed grabber with the gripped feed until it is above the receptacle of the feeding device in order to introduce said feed into the receptacle,
  b) repeating step a) in order to load a batch of feed into the receptacle of the feeding device,
  c) autonomously moving the feeding device with the batch of feed received in the receptacle towards the animals.

By using the feed grabber with the arm according to the invention, the method for feeding the animals according to the invention is particularly reliable.

The invention will now be explained in more detail with reference to the attached figures.

Figure 1:
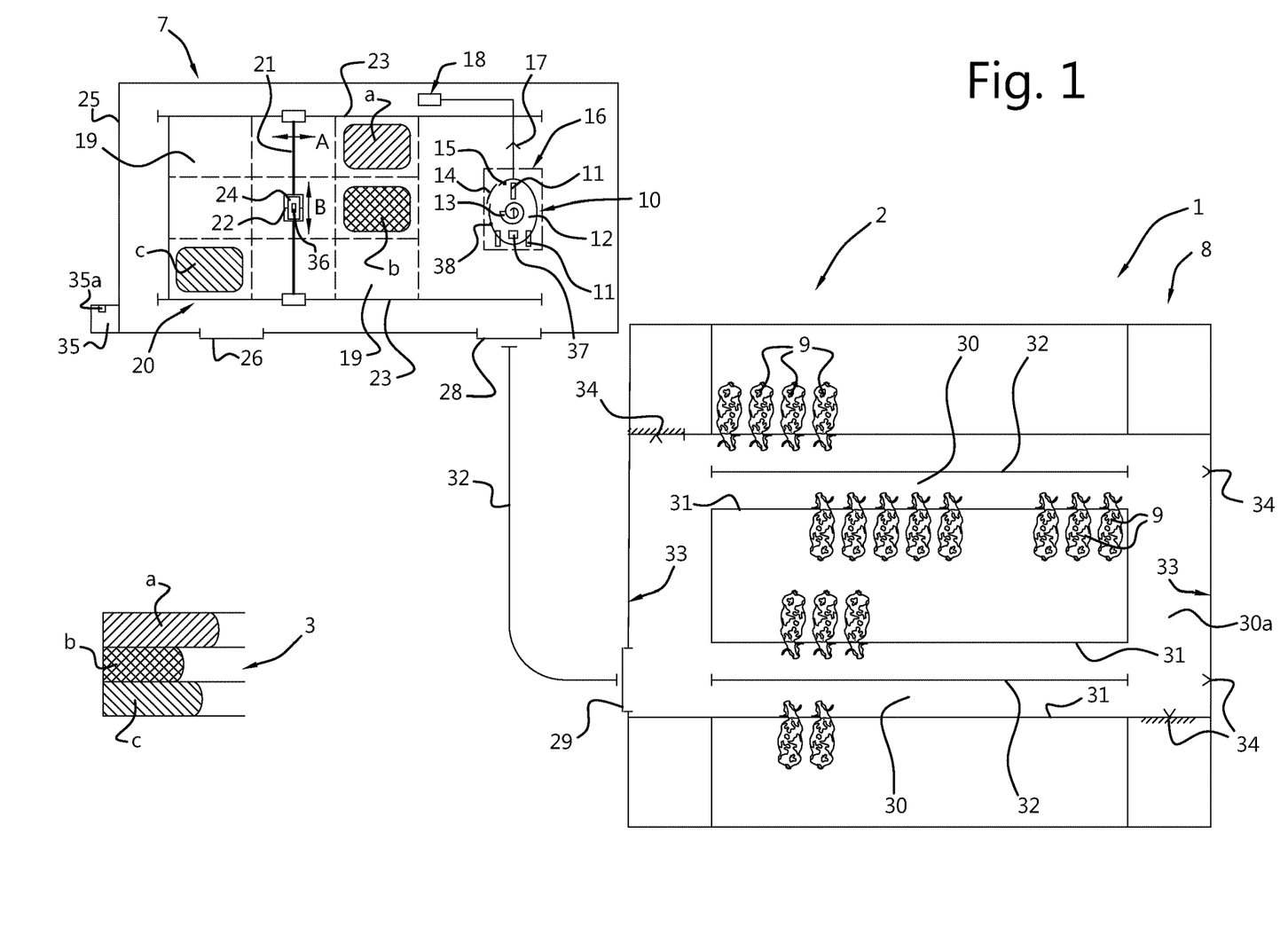
FIG. 1 shows a diagrammatic top view of a feeding system according to the invention.

The feeding system for feeding animals, in particular cows, such as dairy cows or meat cows, is denoted overall in FIG. 1 by reference numeral 1. The feeding system 1 is situated in an operating area 2. The feeding system 1 comprises a feed store 3 comprising a plurality of feed types a, b, c, a feed storage system 7 containing the same feed types a, b, c, an animal shed 8 containing animals 9, and an autonomous feeding device 10 for feeding the animals 9 feed from the feed storage system 7. Although the feed store 3 illustrated diagrammatically in FIG. 1 comprises three adjacent silos containing feed types a, b, c, for example silage, the feed store 3 may comprise further storage devices and/or feed types, such as tower silos with bulk feed, for example maize, potatoes and/or beetroots, or pressed bales. In the same way, the feed storage system 7 may also contain more than the three feed types a, b, c illustrated in FIG. 1. Obviously, the operating area 2 may, if desired, also contain a dwelling, one or more further animal sheds, barns and other buildings (not shown).

In this exemplary embodiment, the autonomous feeding device 10 for feeding the animals 9 is configured as a self-propelled feed wagon. Obviously, it is possible according to the invention for the feeding system 1 to comprise more than one autonomous feed wagon 10, in particular two autonomous feed wagons 10 (not shown). By means of wheels 11, the feed wagon 10 can travel across a floor, farm yard or other surface. The feed wagon 10 comprises a receptacle 12 for receiving a batch of feed. In this exemplary embodiment, a mixing device 13 for cutting and/or mixing feed is provided in the receptacle 12. A dispensing device 14 is provided for the dispensing and/or metering the feed from the receptacle 12. The dispensing device 14 comprises for example a door which is displaceable between a closed and open position.

The feed wagon 10 is autonomously displaceable by means of a driving and steering system for driving and steering the feed wagon 10 (not shown). The driving and steering system of the feed wagon 10 is controllable by a control unit 15 of the feed wagon 10. In this exemplary embodiment, the driving and steering system comprises in each case an electrical drive motor (not shown) for each rear wheel 11. The electrical drive motors of the rear wheels 11 are controllable independently of each other. By controlling the rotary speed of the rear wheels 11, the feed wagon 10 can drive straight ahead, reverse in a straight line or take a bend.

The driving and steering system comprises a battery system for storing electrical energy (not shown). The battery system is connected to the electrical drive motors. In FIG. 1, the feed wagon 10 is arranged in a feed loading location 16, in which the receptacle 12 of the feed wagon 10 is filled with feed. The feed loading location 16 comprises a charging point 17 of a charging system 18 for charging the battery system of the feed wagon 10. The feed loading location 16 is thus also a charging station. The control unit 15 of the feed wagon 10 is configured to control the mixing device 13 in such a manner that the mixing device 13 mixes the feed received in the receptacle 12 while the feed wagon 10 is connected to the loading point 17 and the battery system of the feed wagon 10 is charged by means of the charging system 18.

In this exemplary embodiment, the feed storage system 7 comprises a feed kitchen. The feed kitchen forms an intermediate feed store. The feed kitchen comprises a number of feed storage locations 19 for containing the feed types a, b, c and, optionally, further feed types (not shown). The feed storage locations 19 are arranged in such a manner that they are separate from each other—the feed storage locations 19 are, for example, formed by marked sections on a floor, on which a block of silage or a pressed bale are situated. It is also possible for one or more of the feed storage locations 19 to comprise a trough for receiving bulk feed, such as maize, potatoes or beetroots. The capacity of the feed storage system 7 is limited to a number of days. The amounts of feed of the feed types a, b, c which may be accommodated in the feed storage system 7 are smaller than the amounts of feed of those feed types a, b, c which are stored in the feed store 3.

A feed loading device 20 is provided to transfer feed from the feed storage system 7 to the receptacle 12 of the feed wagon 10 if the feed wagon 10 is positioned at the feed loading location 16. In this exemplary embodiment, the feed loading device 20 comprises a movable carrying rail 21 which is displaceably (see arrow A) arranged on two fixed carrying rails 23 which are arranged mutually parallel to each other and at a distance apart. The movable carrying rail 21 comprises a crab or trolley 22 (see arrow B) which is movable thereon. The crab 22 is provided with a vertically movable feed grabber 24 to grab feed at the feed storage locations 19. The feed grabber 24 which is suspended from the crab 22 can move in a substantially horizontal plane above each of the feed storage locations 19.

After the feed grabber 24 has taken an amount of feed from one of the feed storage locations 19, the feed grabber 24 can move this feed until it is situated above the receptacle 12 of the feed wagon 10 and then drop it into the receptacle 12. By transferring a plurality of feed types to the receptacle 12 of the feed wagon 10, a batch of mixed feed of feed types in accordance with a desired ration is produced, i.e. a batch of mixed feed (kg) of feed types in a desired ratio. Incidentally, the feed grabber 24 could also be integrated with met the feed wagon 10. In that case, the feed grabber 24 of the feed wagon 10 loads the receptacle 12 with the desired amount and composition of feed.

Obviously, the feed storage system 7 may also be designed differently. Instead of or in addition to the feed storage locations 19 illustrated in FIG. 1, the feed storage system 7 may comprise one or more other feed storage devices, such as a driven conveyor belt for receiving pressed bales in combination with a separating device for separating feed from a bale, for example a cutter or a knife, and/or a trough for bulk feed with an auger for the metered dispensing of the feed, and/or a tower silo and/or in yet another way. In this case, the feed loading device may be provided with one or more driven conveyor belts for moving the feed from the or every feed storage device into the receptacle 12 of the feed wagon 10.

In addition, it is possible for the feed not to be mixed and/or cut in the receptacle 12 of the feed wagon 10, but in a stationary mixer which is positioned near the feed storage system 7 (not shown). In that case, the feed grabber 24 moves a batch of feed from the feed storage system 7 into the stationary mixer. After it has been mixed and/or cut by means of the stationary mixer, the mixed feed is then loaded into the feed wagon 10. Then, the receptacle 12 of the feed wagon 10 does not have to be fitted with a mixing device.

The feed storage system 7 is surrounded by a safety fence 25. An access door 26 is provided in the safety fence 25, so that, for example, a forklift truck of tractor can enter the feed storage system 7 via the access door 26 in order to refill the feed storage locations 19 with the different feed types a, b, c from the feed store 3. In addition, the safety fence 25 comprises a connecting door 28 for the feed wagon 10. The feed wagon 10 can drive in and out of the feed storage system 7 via the connecting door 28. Obviously, it is possible for the safety fence 25 to have only one door, via which both the feed wagon 10 and the refill device 27 can move in and out of the feed storage system 7.

In addition to the safety fence 25, the feeding system 1 may comprise further safety features, for example an emergency stop which immediately stops the feed wagon 10 and/or the feed loading device 20. In this case, for example, an alarm may go off and/or a message may be sent to a user, such as an email or text message.

The animal shed 8 comprises a door opening 29, as a result of which the feed wagon 10 can drive into and out of the animal shed 8. The door opening 29 is closable by a shed door which can preferably be opened automatically. In this exemplary embodiment, the animal shed 8 has two feeding alleys 30. Obviously, a greater or smaller number of feeding alleys may be provided. In this exemplary embodiment, every feeding alley 30 is delimited on either side by a feed fence 31. A plurality of feeding stations for feeding the animals 9 are situated along every feed fence 31, i.e. a plurality of animals 9 can stand next to one another along the feed fence 31. Viewed from the feeding alley 30, the feeding stations are situated behind the feed fence 31. The feeding stations extend substantially perpendicular with respect to the feeding alley 30. The animals 19 are positioned with their head facing the feeding alley 30 and they are able to pass their heads through the feed fence 31 to eat feed which has been deposited along the feed fence 31 by the feed wagon 10.

The feed fences 31 in the animal shed 8 are situated at a distance from the feed loading location 16 of the feed storage system 7. The feed wagon 10 can access each of the feed fences 31 from the feed loading location 16. Various beacons are disposed in the operating area 2. In this exemplary embodiment, the beacons are formed by strips 32 fitted in or on a floor or other surface, walls 33 of the animal shed 8 and impact points 34. The feed wagon 10 comprises a sensor system (not shown) which is configured to cooperate with the beacons 32, 33, 34. In addition, the feed wagon 10 comprises a gyroscope (not shown) in order to drive straight ahead over a predetermined distance. The gyroscope is connected to the control unit 15 of the feed wagon 10. The feeding system 1 comprises a control system 35 with a memory 35a in which data are stored, such as navigation data, ration data and operating data. The navigation data comprise beacon data of the beacons 32, 33, 34. On the basis of the navigation data, the feed wagon 10 is able to travel different routes from the feed loading location 16 to and through the animal shed 8. The ration data comprise, for example, a plurality of rations for different groups of animals 9. The operating data comprise, for example, operating data for operating the dispensing device 14 of the feed wagon 10. Although the control system 35 has been drawn diagrammatically on the left in FIG. 1, the control system 35 could also be situated at a different location.

The feed wagon 10 comprises a sensor device 38 for measuring the amount of feed which is situated along the feed fence 31 along which the feed wagon 10 drives. The control system 35 is configured to receive values of the measured amount of feed along each feed fence 31. The control system 35 is configured to prepare a subsequent batch of feed on the basis of the measured amounts of feed along each feed fence 31. The control system 35 controls the feed wagon 10 and the feed loading device 20 in such a way that a new batch of feed is delivered before the animals 9 have completely eaten the feed, i.e. the control system 35 ensures that there is always feed present along each feed fence 31.

Figure 2:
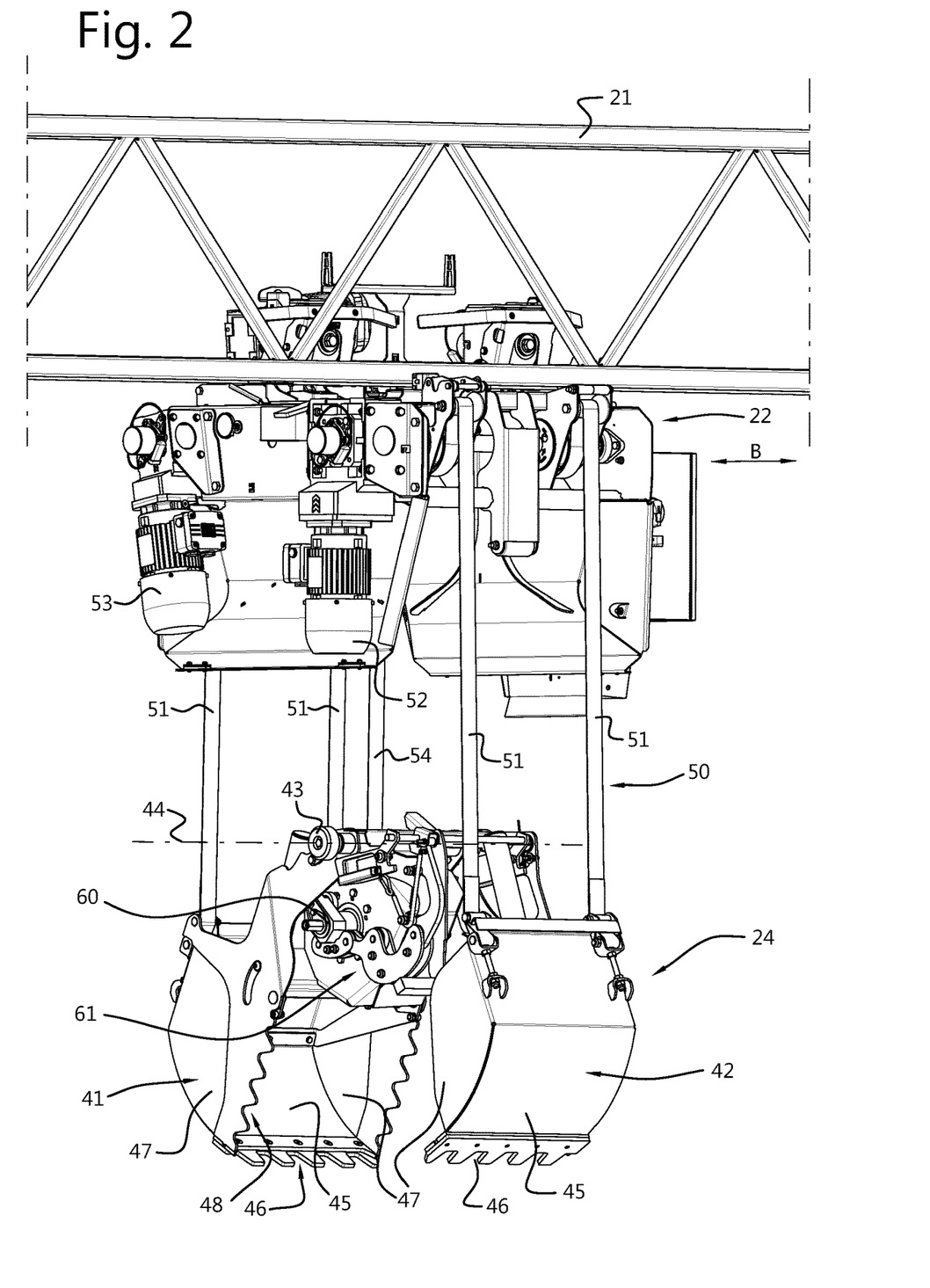
FIG. 2 shows a perspective view of a feed grabber of the feeding system illustrated in FIG. 1.

The feed grabber 24 of the feed loading device 20 is illustrated in more detail in FIG. 2. The feed grabber 24 is controlled by the control system 35. While the feed wagon 10 is located at the feed loading location 16, the feed grabber 24 takes amounts of the feed types a, b, c from the feed storage locations 19 to the receptacle 12 of the feed wagon 10 on the basis of the ration data of the selected ration, in such a way that the receptacle 10 receives the selected ration. While the feed grabber 24 is composing a batch of feed according to a desired ration in the receptacle 12 of the feed wagon 10, the feed grabber 24 moves above the feed storage locations 19. The feed wagon 10 comprises a weighing device 37 which is configured to measure the weight (kg) of feed which is received in the receptacle 12. The weighing device 37 is connected to the control system 35. While a batch of feed is being loaded into the receptacle 12 of the feed wagon 10, the control system 35 monitors how much feed (kg) of every feed type a, b, c is loaded into the receptacle 12.

The feed grabber 24 comprises two grab buckets 41, 42 which are hingeably connected to each other between an open position and a closed position by means of an upper hinge 43. The upper hinge 43 determines a hinge axis 44 which, in this exemplary embodiment, runs substantially parallel to the direction of movement (arrow B) of the crab 22.

Every grab bucket 41, 42 comprises a grab bucket bottom 45 with a bottom edge 46, and grab bucket side walls 47 which extend on either side of the grab bucket bottom 45. Although a portion of the right-hand grab bucket 42 has been omitted in FIG. 2, each grab bucket side wall 47 is delimited by a side edge 48. In the fully closed position of the grab buckets 41, 42, the bottom edges 46 of the grab bucket bottoms 45 and the side edges 48 of the grab bucket side walls 47 substantially adjoin each other (see FIGS. 3e and 4). In practice, the bottom edges 46 and the side edges 48 of the grab buckets 41, 42 can remain slightly apart in the closed position, due to the fact that they hold an amount of feed between them.

The feed grabber 24 is suspended from the crab 22 so as to be vertically displaceable by means of a hoisting device 50. The hoisting device 50 comprises a first electrical motor 52 which is fitted to the crab 22, and hoisting belts 51, the bottom ends of which are attached to the grab buckets 41, 42. The crab 22 is fitted with a second electrical motor 53 which is connected, by means of a transmission device, to a winding-up body 60 which is fitted on the grab bucket 41 which is drawn on the left in FIG. 2. The transmission device comprises a closing/auxiliary hoisting belt 54 and a reduction gear unit. The second electrical motor 53, the transmission device with the closing/auxiliary hoisting belt 54 and the reduction gear unit, as well as the winding-up body 60 form part of an actuation device for actuating the grab buckets 41, 42 from the open position shown in FIG. 3a into the closed position shown in FIGS. 3e, 4. This will be explained in more detail below.

Figure 3A:
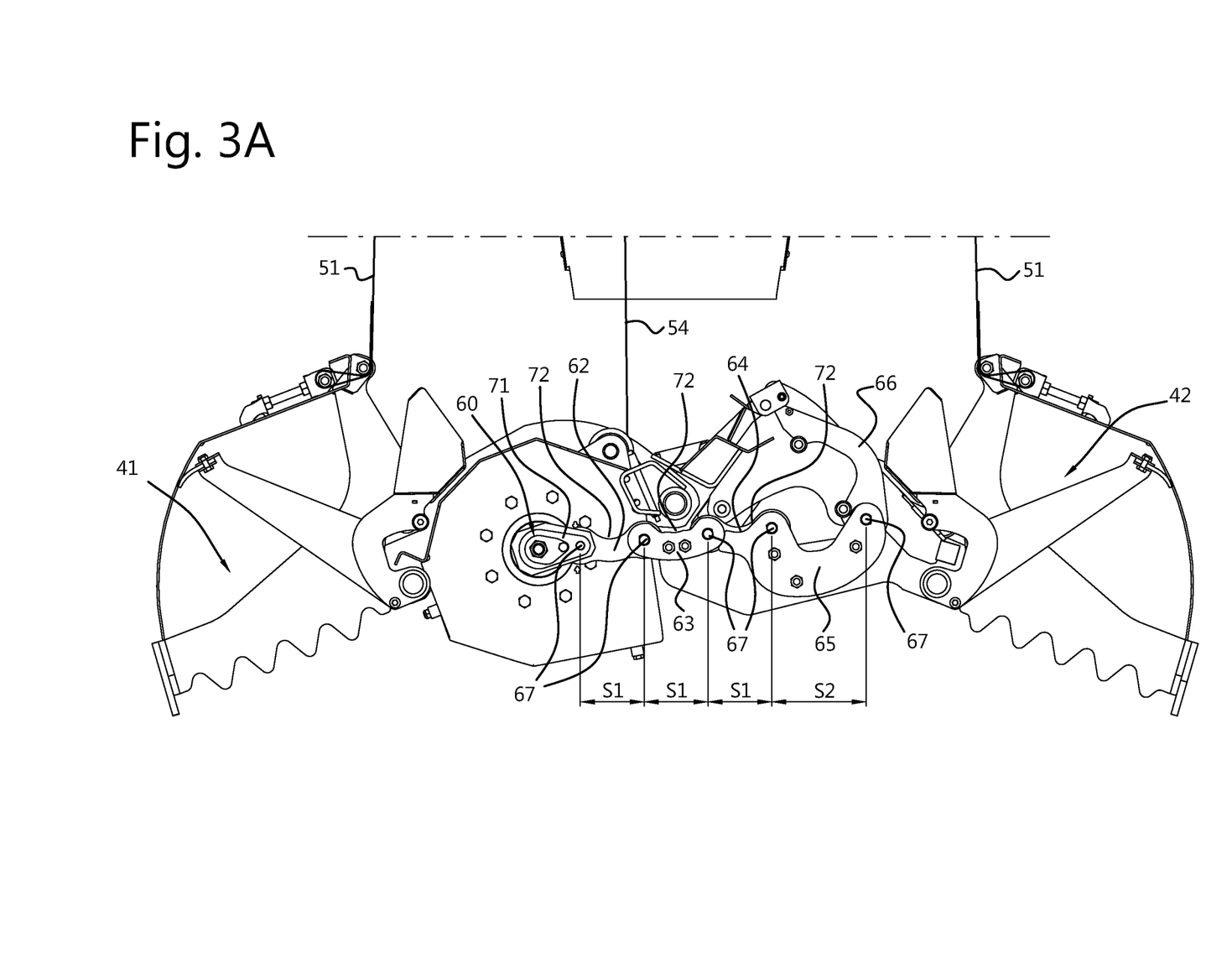
FIGS. 3*a* to 3*e* show front views of the feed grabber illustrated in FIG. 2 when the grab buckets are moved from the open position to the closed position.
Figure 3B:
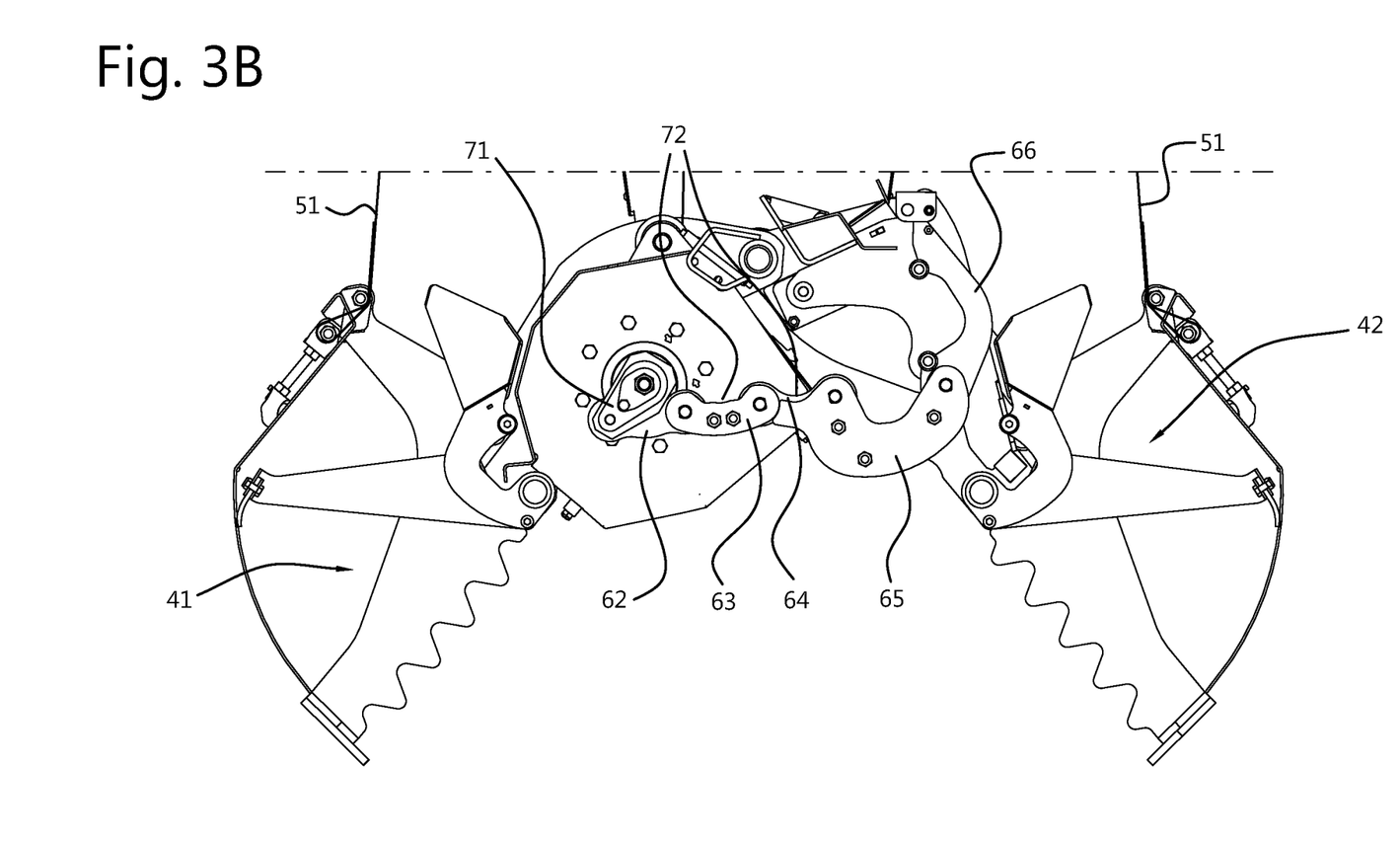
Figure 3C:
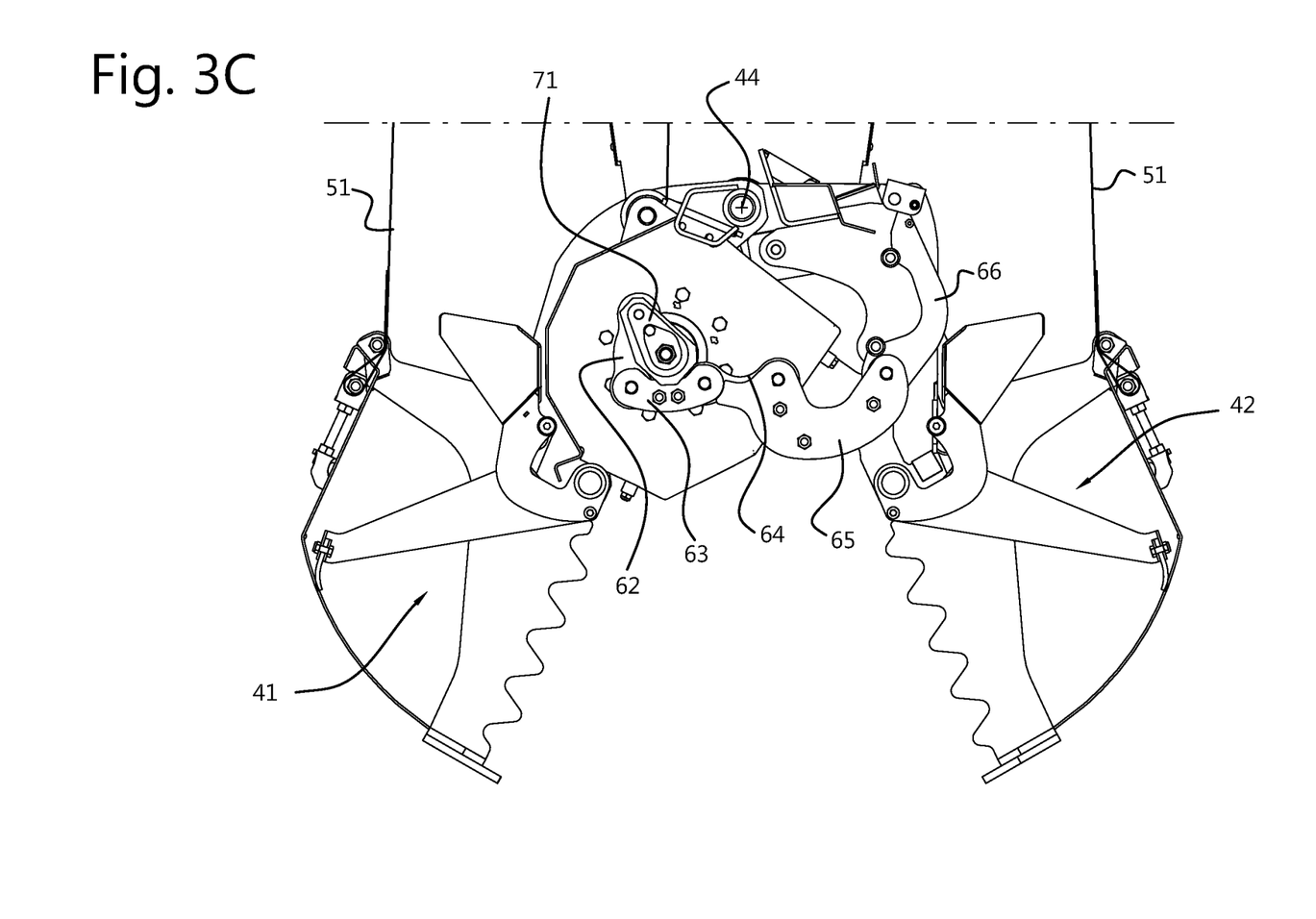
Figure 3D:
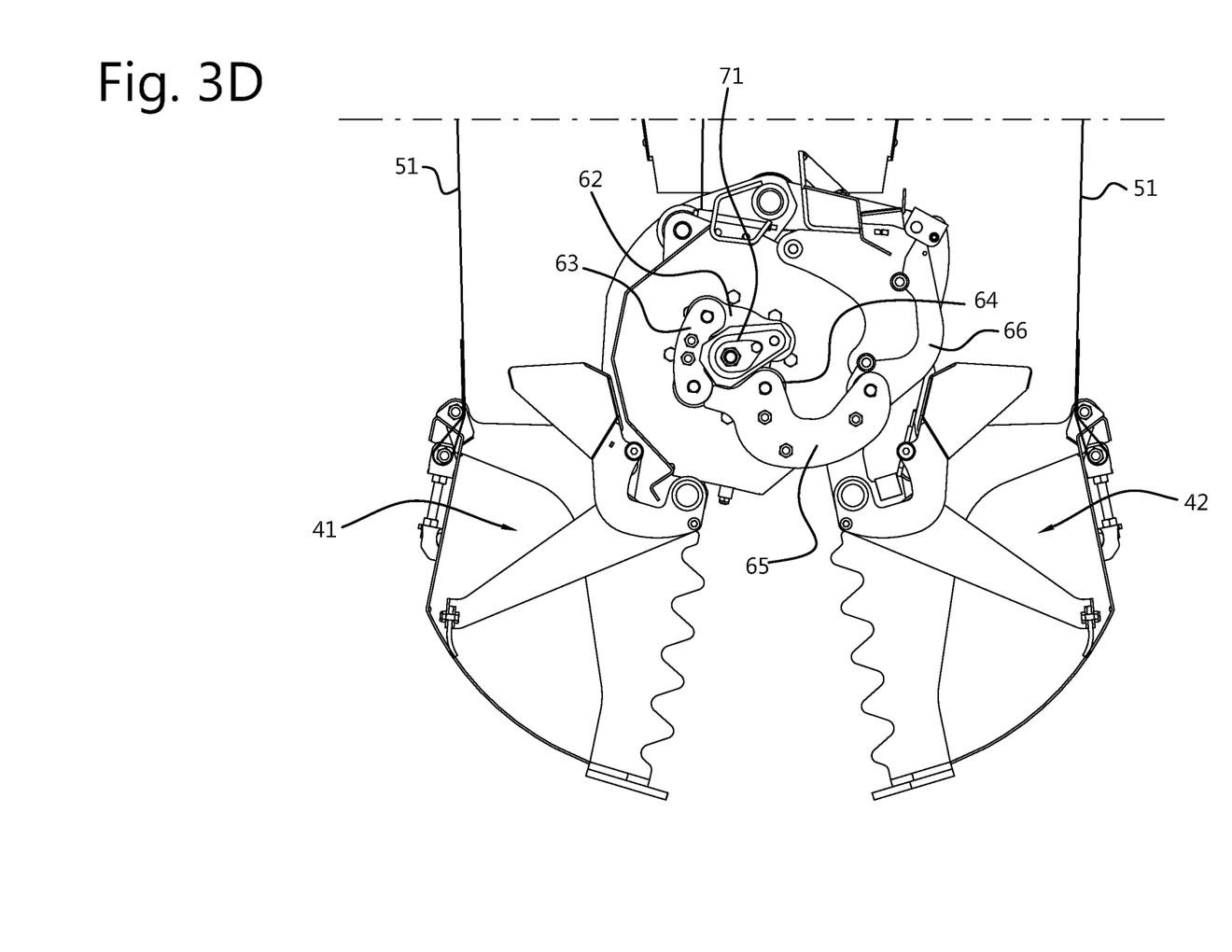
Figure 3E:
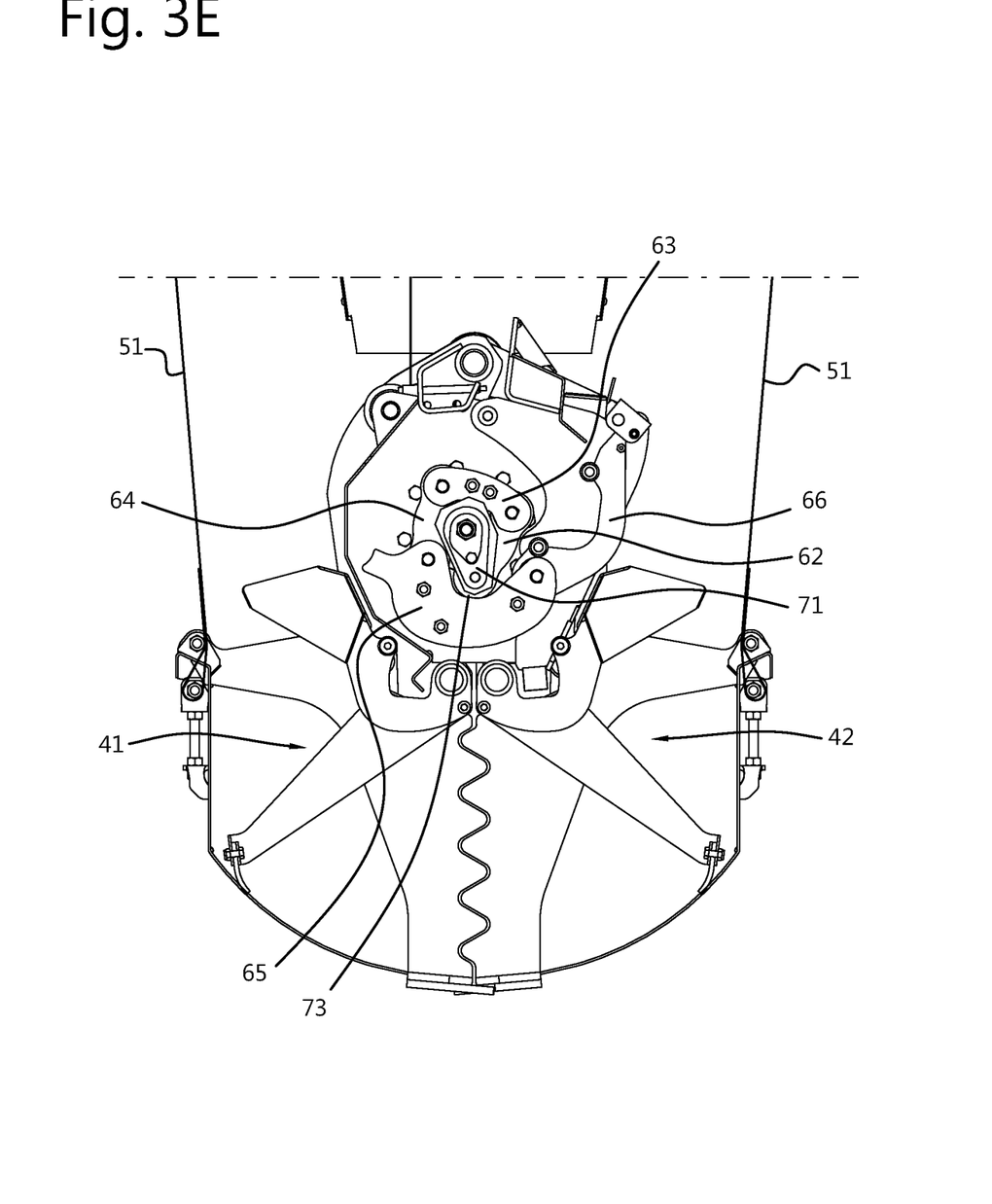

In order to pick up an amount of feed, the feed grabber 24 is first lowered by suitably actuating the first and second electrical motor 52, 53. In this case, the hoisting belts 51 and the closing/auxiliary hoisting belt 54 are lowered in a synchronized manner in such a way that the grab buckets 41, 42 move downwards on account of the force of gravity and the grab buckets 41, 42 hingedly move around the upper hinge 43 into the open position, as is illustrated in FIG. 3a. When the feed grabber 24 has been lowered to a suitable height above, for example, a block of silage, the grab buckets 41, 42 are operated by means of the actuation device in order to pull the grab buckets 41, 42 towards the closed position illustrated in FIGS. 3e, 4. This is shown in FIGS. 3a to 3e in steps.

Figure 4:
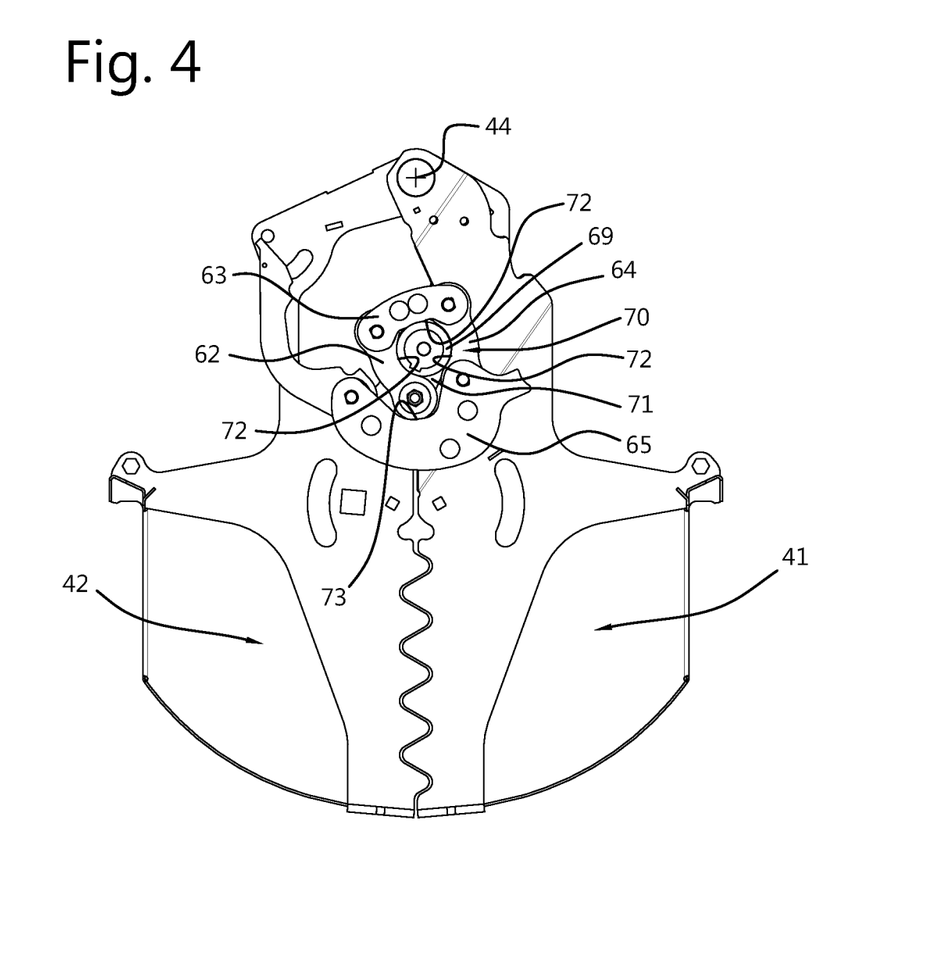
FIG. 4 shows a rear view of the feed grabber illustrated in FIG. 2 in the closed position.

The winding-up body 60 which is fitted to the grab bucket 41 drawn on the left in FIG. 2, comprises a winding core 69 with a substantially cylindrical smooth outer surface 70 (see FIG. 4). A crank arm 71 is attached to the winding core 69 and radially projects from the winding core 69. The actuation device furthermore comprises an articulated arm 61 which is connected between the crank arm 71 of the winding-up body 60 and the grab bucket 42 which is drawn on the right in FIG. 2, in this exemplary embodiment by means of a hook part 66 which engages with this grab bucket 42. The hook part 66 is stationary with respect to the grab bucket 42 and in that sense forms part of the grab bucket 42.

In this exemplary embodiment, the arm 61 comprises four elongate arm sections 62, 63, 64, 65 which are hingeably connected to each other. Every arm section 62, 63, 64, 65 has two hinge axes 67 which determine a pitch length, i.e. the distance between the hinge axes 67 of said arm section 62, 63, 64, 65 (see FIG. 3a). The pitch length s1 of the arm section 62 connected to the crank arm 71 and the pitch length s1 of the adjacent arm sections 63, 64 are substantially equal. The pitch length s2 of the subsequent arm section 65 is greater than said pitch length s1.

In the open position of the grab buckets 41, 42, the arm sections 62, 63, 64, 65 are substantially aligned to be in line with one another. In order to close the grab buckets 41, 42, the second electrical motor 53 is operated which pulls in the closing/auxiliary hoisting belt 54. As a result thereof, the winding-up body 60 with the crank arm 71 is driven in a rotating manner. As is illustrated in FIGS. 3a to 3e, the winding-up body 60 performs approximately 1.5 turns when moving the grab buckets 41, 42 from the open position to the closed position. In this case, the three arm sections 62, 63, 64 are wound substantially completely around the cylindrical outer surface 70 of the winding core 69, i.e. the arm sections 62, 63, 64 are configured in such a way that the winding circumference of the winding core 69 can be covered substantially in its entirety by the three arm sections 62, 63, 64. In other words, the sum of the pitch lengths s1 of the arm section 62 connected to the crank arm 71 and the two adjacent arm sections 63, 64 is only slightly greater than the winding circumference of the winding core 69.

When winding the arm 60 around the winding circumference of the winding core 69, there is a clearly noticeable polygon effect. This is caused by the ratio between the winding circumference and the pitch lengths s1 of the arm sections 62, 63, 64. The arm sections 62, 63, 64 are (far) too long to prevent a polygon effect. However, this is acceptable with the feed grabber 24 according to the invention, because the speed of movement of the grab buckets 41, 42 is low and the arm 60 performs a reciprocating movement, contrary to most chain drives, which go around.

Due to the fact that the arm sections 62, 63, 64, 65 of the arm 60 are relatively large, these may be made from a material having limited strength. This brings stainless steel within reach for this application. By making the entire arm 60 from stainless steel, the corrosion resistance is particularly high. For the same reason, the grab buckets 41, 42, the winding-up body 60 and all other components which are situated under the hoisting belts 51 and come into contact with feed during operation in this exemplary embodiment are entirely made of stainless steel.

In order to allow said arm sections 62, 63, 64 to reliably adjoin the cylindrical outer surface 70 of the winding core 69 during winding up, said arm sections 62, 63, 64 have correspondingly formed longitudinal edges 72 on the longitudinal side thereof which comes into contact with said outer surface 70. The fourth arm section 65 with the greater pitch length s2 comprises a longitudinal edge 73 with a shape which engages with the crank arm 71 in the closed position of the grab buckets 41, 42 (see FIG. 3e). As a result thereof, the arm 60 remains compact in the fully wound-up position.

After the grab buckets 41, 42 have taken an amount of feed and have been substantially closed, the hoisting belts 51 are pulled in by means of the first electrical motor 52. Simultaneously, the second electrical motor 53 pulls in the closing/auxiliary hoisting belt 54 in a suitable way and in a synchronized manner. As a result thereof, the feed grabber 24 with the grabbed amount of feed is lifted up. The movable carrying rail 21 and the crab 22 can then move the feed grabber 24 to a position above the receptacle 12 of the autonomous feeding device 10, after which the feed grabber 24 releases the amount of feed.

The invention is not limited to the exemplary embodiment illustrated in the figures. The person skilled in the art can make various modifications which are within the scope of the invention. For example, a different material than stainless steel and having substantially the same properties may be used, such as a suitable (carbon) fibre-reinforced plastic. The arm may also comprise fewer or more arm sections.

The invention claimed is:

1. A feeding system for feeding animals, comprising:
a feed storage system for storing feed for the animals;
an autonomous feeding device for feeding the animals feed from the feed storage system, wherein the feeding device is provided with a receptacle for receiving a batch of feed; and
a feed loading device for loading feed from the feed storage system into the receptacle of the autonomous feeding device, wherein the feed loading device is provided with a feed grabber comprising two grab buckets which are hingeable between an open position and a closed position, and wherein the feed grabber is provided with an actuation device for actuating the grab buckets from the open position to the closed position, wherein the actuation device is provided with a rotatably drivable winding-up body which is connected to one of the grab buckets and comprises a winding circumference, and an arm which is connected between the winding-up body and the other grab bucket, wherein the arm comprises a plurality of mutually hingeably connected arm sections which are made from stainless steel or a material having substantially the same strength and corrosion-resistant properties as stainless steel, wherein the arm sections, in the open position of the grab buckets, extend substantially in line with one another, and wherein the arm sections, from the open position of the grab buckets, when the winding-up body is rotatably driven, are wound about the winding circumference of the winding-up body in order to pull the grab buckets towards the closed position, and wherein the arm sections are configured in such a way that the winding circumference of the winding-up body can be covered substantially in its entirety by at most 8 arm sections.

2. The feeding system according to claim 1, wherein the grab buckets and/or the winding-up body and/or the arm are/is entirely made of stainless steel or a material having substantially the same strength and corrosion-resistant properties as stainless steel.

3. The feeding system according to claim 2, wherein, when the grab buckets move from the open position to the closed position, the winding-up body performs more than 1 turn, such as substantially 1.5 turns, and wherein, after the winding circumference of the winding-up body has been covered substantially entirely by a number of the arm sections, only one further arm section extends on top or alongside thereof.

4. The feeding system according to claim 2, wherein each arm section has a pitch length which is determined by the distance between the two hinge axes of said arm section, and wherein the sum of the pitch lengths of the arm section connected to the winding-up body and the adjacent 2 or 3 arm sections is substantially equal to or greater than the winding circumference of the winding-up body in order to cover the winding-up body substantially completely in the closed position.

5. The feeding system according to claim 2 wherein the winding-up body is provided with a winding core which determines the winding circumference, and a crank arm which is attached to the winding core and which projects radially with respect to the winding core, and wherein the arm section connected to the winding-up body is hingeably connected to the crank arm, and wherein the arm sections are wound around the winding core from the open position of the grab buckets when the winding-up body is being rotatably driven.

6. The feeding system according to claim 1, wherein, when the grab buckets move from the open position to the closed position, the winding-up body performs more than 1 turn, and wherein, after the winding circumference of the winding-up body has been covered substantially entirely by a number of the arm sections, only one further arm section extends on top or alongside thereof.

7. The feeding system according to claim 6, wherein each arm section has a pitch length which is determined by the distance between the two hinge axes of said arm section, and wherein the sum of the pitch lengths of the arm section connected to the winding-up body and the adjacent 2 or 3 arm sections is substantially equal to or greater than the winding circumference of the winding-up body in order to cover the winding-up body substantially completely in the closed position.

8. The feeding system according to claim 6 wherein the winding-up body is provided with a winding core which determines the winding circumference, and a crank arm which is attached to the winding core and which projects radially with respect to the winding core, and wherein the arm section connected to the winding-up body is hingeably connected to the crank arm, and wherein the arm sections are wound around the winding core from the open position of the grab buckets when the winding-up body is being rotatably driven.

9. The feeding system according to claim 1, wherein each arm section has a pitch length which is determined by the distance between the two hinge axes of said arm section, and wherein the sum of the pitch lengths of the arm section connected to the winding-up body and the adjacent 2 or 3 arm sections is substantially equal to or greater than the winding circumference of the winding-up body in order to cover the winding-up body substantially completely in the closed position.

10. The feeding system according to claim 9, wherein the pitch length of the arm section connected to the winding-up body and the pitch length of the adjacent arm sections which together, in the closed position of the grab buckets, substantially completely cover the winding circumference are substantially equal to each other, with the pitch length of a subsequent arm section being greater than the pitch length of the arm section connected to the winding-up body.

11. The feeding system according to claim 1 wherein the winding-up body is provided with a winding core which determines the winding circumference, and a crank arm which is attached to the winding core and which projects radially with respect to the winding core, and wherein the arm section connected to the winding-up body is hingeably connected to the crank arm, and wherein the arm sections are wound around the winding core from the open position of the grab buckets when the winding-up body is being rotatably driven.

12. The feeding system according to claim 11, wherein the winding core comprises a substantially cylindrical outer surface, and wherein the arm sections which are wound around the winding core from the open position of the grab buckets when the winding-up body is being rotatably driven and which come into contact with said outer surface on a longitudinal side thereof, are provided with longitudinal edges on said longitudinal sides, which edges have a shape which at least partly corresponds to said outer surface.

13. The feeding system according to claim 1 wherein the feed grabber is suspended from a crab so as to be vertically displaceable by means of a hoisting device, which comprises a first electrical motor which is fitted to the crab, and wherein the actuation device for actuating the grab buckets from the open position to the closed position is provided with a second electrical drive motor which is fitted to the crab, and a transmission device for transmitting a drive torque from the second electrical drive motor to the winding-up body which is connected to one of the grab buckets.

14. The feeding system according to claim 1 wherein each grab bucket comprises a grab bucket bottom with a bottom edge, and wherein each grab bucket is provided with grab bucket side walls which extend on either side of the grab bucket bottom of said grab bucket, wherein each grab bucket side wall is delimited by a side edge, wherein the bottom edges of the grab bucket bottoms and the side edges of the grab bucket side walls substantially adjoin each other in the closed position of the grab buckets.

15. The feeding system according to claim 1, wherein the feed storage system comprises a plurality of feed storage locations which are separated from each other, wherein the feed grabber is arranged above the feed storage locations so as to be displaceable in a substantially horizontal plane and is substantially vertically displaceable for grabbing in each case an amount of feed from one of the feed storage locations and transferring it to the receptacle of the autonomous feeding device for loading it with a batch of feed for the animals.

16. The feeding system according to claim 1, wherein the feed grabber is integrated with the autonomous feeding device.

17. The feeding system according to claim 1 wherein the feeding system comprises at least one feed fence for feeding the animals, and wherein the feeding device is configured to autonomously move a batch of feed contained in the receptacle from the feed storage system to the feed fence and autonomously dispensing and/or metering said feed along the feed fence.

18. A feed grabber comprising two grab buckets which are hingeable between an open position and a closed position, wherein the feed grabber is provided with an actuation device for actuating the grab buckets from the open position to the closed position, wherein the actuation device is provided with a rotatably drivable winding-up body which is connected to one of the grab buckets and comprises a winding circumference, and an arm which is connected between the winding-up body and the other grab bucket, wherein the arm comprises a plurality of mutually hingeably connected arm sections which are made from stainless steel or a material having substantially the same strength and corrosion-resistant properties as stainless steel, wherein the arm sections extend substantially in line with one another in the open position of the grab buckets, and wherein the arm sections, from the open position of the grab buckets, when the winding-up body is rotatably driven, are wound around the winding circumference the winding-up body in order to pull the grab buckets towards the closed position, and wherein the arm sections are configured such that the winding circumference of the winding-up body can be covered substantially completely by at most 8 arm sections.

19. The feed grabber according to claim 18, wherein the grab buckets and/or the winding-up body and/or the arm are/is entirely made of stainless steel or a material having substantially the same strength and corrosion-resistant properties as stainless steel.

20. A method for feeding animals, by means of the feeding system according to claim 1, and wherein the method comprises the following steps:
 a) grabbing an amount of feed from the feed storage system by means of the feed grabber and moving the feed grabber with the gripped feed until it is above the receptacle of the feeding device in order to introduce said feed into the receptacle;
 b) repeating step a) in order to load a batch of feed into the receptacle of the feeding device; and
 c) autonomously moving the feeding device with the batch of feed contained in the receptacle towards the animals.

* * * * *